United States Patent [19]
Frye

[11] Patent Number: 6,047,129
[45] Date of Patent: Apr. 4, 2000

[54] SOFTWARE UPDATING AND DISTRIBUTION

[76] Inventor: Russell Frye, 1 Langfellow Pl., Boston, Mass. 02114

[21] Appl. No.: 09/033,811

[22] Filed: Mar. 3, 1998

Related U.S. Application Data

[63] Continuation of application No. 08/176,429, Dec. 30, 1993, abandoned.

[51] Int. Cl.$^7$ .................................................. G06F 15/177
[52] U.S. Cl. ............................................ 395/712; 709/221
[58] Field of Search ................................... 395/712, 653; 709/221

[56] References Cited

U.S. PATENT DOCUMENTS

| | | | |
|---|---|---|---|
| 4,974,149 | 11/1990 | Valenti | 709/217 |
| 5,212,789 | 5/1993 | Rago | 707/8 |
| 5,361,360 | 11/1994 | Ishigami et al. | 395/712 |
| 5,381,534 | 1/1995 | Shi | 395/706 |
| 5,483,647 | 1/1996 | Yu et al. | 709/217 |
| 5,580,177 | 12/1996 | Gase et al. | 395/114 |
| 5,664,170 | 9/1997 | Taylor | 709/226 |
| 5,764,911 | 6/1998 | Tezuka et al. | 709/223 |
| 5,771,381 | 6/1998 | Jones et al. | 709/221 |
| 5,790,796 | 8/1998 | Sadowsky | 395/712 |
| 5,838,918 | 11/1998 | Prager et al. | 395/200.51 |

OTHER PUBLICATIONS

Exhibit A—Press Release, dated Oct. 9, 1992, four pages.

Exhibit B—Direct mail piece, one page, mailed in Oct., 1992.

Exhibit C—Specification sheet, distributed at NetWorld, Dallas, Oct. 13–15, 1992, two pages.

Exhibit D—Specification sheet, distributed at Comdex, Las Vegas, Nov. 16–20, 1992, three pages.

Ellison, C., "LAN Automatic Inventory", PC Magazine Jun. 30, 1992, v. 11, n. 12, p. 305(3).

Hart, M., "Control change from the ground up: configuration management can keep your network flying", LAN Technology, Nov. 1991, v. 7, n. 11, p. 26(7).

Pulaski, E., "Choosing the right audit/inventory product: tips to help you select the tool that best fits your individual need", LAN Times, Jul. 6, 1992, v. 9, n. 12, p. 27(2).

Krohn, N., "Frye unwraps LAN software updating, distribution package", PC Week, Oct. 26, 1992, v. 9, n. 43, p. 49(2).

Ellison, C., "LAN inventory software", PC Magazine, Jun. 30, 1992, v. 11, n. 12, p. 297(15).

Mather, Dan, Automated installation and updating of Windows–based Internet applications at James Madison University, 1995, pp. 207–209.

*Primary Examiner*—Tariq R. Hafiz
*Assistant Examiner*—John Q. Chavis
*Attorney, Agent, or Firm*—Wolf, Greenfield & Sacks, P.C.

[57] ABSTRACT

The present invention reduces complicated support and maintenance issues to a simple model. This model is called a procedure. A procedure includes two elements. The first element is called "criteria". Criteria are specified by the user and are used to create a filter that determines which workstations, workstation directories, workstation files, users, and/or file server directories are to be updated. The second element of a procedure is called an "action". Actions are used to specify what steps are to be taken automatically at the selected workstations or file server directories. Any type of process that can be carried out from the workstation keyboard can be automated using an action. One embodiment of the invention provides a system for updating software on at least one computer connected to a computer network, including hardware and software for defining at least one procedure, the at least one procedure including a set of criteria specifying a predetermined condition of the at least one computer hardware and software, responsive to the hardware and software for defining, for executing a predetermined action, such as a program, when the set of criteria are true.

6 Claims, 12 Drawing Sheets

Microfiche Appendix Included
(3 Microfiche, 254 Pages)

Software Update and Distribution System 1.00C    December 20, 1993 10:45:31am

```
┌─────────────────────── Create General Procedure ───────────────────────┐
│              ┌──────────── General Procedure ────────────┐             │
│              │ Criteria                                  │             │
│              │ Actions     ┌─────── Select Option ──────┐│             │
│              │ Procedure   │ run procedure for All Computers │         │
│              │ Save proce  │ specify Criteria to select computers │    │
│              │             └──────────────────────────────┘            │
│                                                                        │
│                                                                        │
│                                                                        │
│ ═══════════════════════════ Status ════════════════════════════════    │
│ Procedure Active: Yes    Start Date 12/20/93    Start Time: 10:33      │
│ Criteria Defined: All Computers Selected        Actions Specified: No  │
│ Procedure Saved: Yes    User Message Defined: No  Memory Available: 159056 │
└────────────────────────────────────────────────────────────────────────┘
         F1-Help              Enter-Accept             Esc-Cancel
```

FIG. 2A

Software Update and Distribution System 1.00C    December 20, 1993 10:54:14am

```
┌─────────────────────── Create General Procedure ───────────────────────┐
│              ┌──────────── General Procedure ────────────┐             │
│              │ Crit ┌─────────── Criteria ──────────┐    │             │
│              │ Acti │   Nodes/users                  │   │             │
│              │ Proc │   Network Group                │   │             │
│              │ Save │   Hardware criteria            │   │             │
│              │      │   Software criteria            │   │             │
│              │      │   Miscellaneous criteria       │   │             │
│              │      │   File criteria                │   │             │
│              │      │   Disk space requirements      │   │             │
│              │      └────────────────────────────────┘   │             │
│                                                                        │
│ ═══════════════════════════ Status ════════════════════════════════    │
│ Procedure Active: Yes    Start Date 12/20/93    Start Time: 10:33      │
│ Criteria Defined: All Computers Selected        Actions Specified: No  │
│ Procedure Saved: Yes    User Message Defined: No  Memory Available: 157616 │
└────────────────────────────────────────────────────────────────────────┘
         F1-Help         Esc-Previous Menu         Enter-Select
```

FIG. 2B

Software Update and Distribution System 1.00C    December 20, 1993 10:47:52am

```
╔══════════════════════════════════════════════════════════════╗
║                   Create General Procedure                   ║
║  ┌──────────────────── Hardware Criteria ────────────────┐   ║
║  │ No hardware items specified. Press INSERT to add an item.│ ║
║  │                                                        │   ║
║  │                                                        │   ║
║  │                                                        │   ║
║  │                                                        │   ║
║  └────────────────────────────────────────────────────────┘   ║
║  Criteria Defined: All Computers Selected    Actions Specified: No  ║
║  Procedure Saved: Yes   User Message Defined: No  Memory Available: 157712 ║
╚══════════════════════════════════════════════════════════════╝
```

F1—Help Ins—Insert Del—Delete Enter—Modify Space—Toggle True—False

FIG. 2C

Software Update and Distribution System 1.00C    December 20, 1993 10:48:14am

```
╔══════════════════════════════════════════════════════════════╗
║                   Create General Procedure                   ║
║  ┌────────────────────── Select Field ──────────────────┐    ║
║  │ BaseRam         — RAM Located Below 640K (K)          │    ║
║  │ BiosClass       — BIOS Class (PC, XT, PS/2, etc)      │    ║
║  │ BiosDate        — BIOS Date                           │    ║
║  │ BiosMfr         — BIOS Manufacturer (IBM, etc)        │    ║
║  │ BiosModel       — BIOS Model Code                     │    ║
║  │ BiosRevision    — BIOS Revision Number                │    ║
║  │ BootDrive       — Boot Drive Letter                   │    ║
║  │ Coprocessor     — Math Coprocessor Type (8087, etc)   │    ║
║  │ DdDriveLetter   — DOS Drive Letter                    │    ║
║  │ DisplayAdapter  — Display Adapter Type (MDA, etc)     │    ║
║  │ DisplayMonitor  — Display Monitor Type (Mono, etc)    │    ║
║  │ ExtendedRam     — RAM Located Above 1024K (K)         │    ║
║  │ HardDisks       — Number of Hard Disks                │    ║
║  │ LdIoDriverNum   — LAN Driver Used IO Driver Number    │    ║
║  │ LdIoRange       — LAN Driver Used IO Range            │    ║
║  └───────────────────────────────────────────────────────┘    ║
║  Criteria Defined: All Computers Selected    Actions Specified: No  ║
║  Procedure Saved: Yes   User Message Defined: No  Memory Available: 157712 ║
╚══════════════════════════════════════════════════════════════╝
```

F1—Help           Enter—Select           Esc—Cancel

FIG. 2D

Software Update and Distribution System 1.00C    December 20, 1993 10:49:46am

```
╔══════════════════ Create General Procedure ══════════════════╗
║ ╔═══════════════════ Select Field ═══════════════════╗        ║
║ ║ ExtendedRam     — RAM Located Above 1024K (K)      ║        ║
║ ║ HardDisks       — Number of Hard Disks             ║        ║
║ ║ LdIoDriverNum   — LAN Driver Used IO Driver Number ║        ║
║ ║ LdIoRange       — LAN Driver Used IO Range         ║        ║
║ ║ LdIoType        — LAN Driver Used IO Type (DMA, IRQ, etc) ║ ║
║ ║ LdLanType       — LAN Driver LAN Type (NetWare, etc) ║      ║
║ ║ MachineMfr      — Machine Manufacturer (IBM, etc)  ║        ║
║ ║ Mouse           — Mouse Installed? (Y/N)           ║        ║
║ ║ MouseButtons    — Number of Mouse Buttons          ║        ║
║ ║ MouseIrq        — Mouse Interrupt Number           ║        ║
║ ║ MouseType       — Mouse Type (Serial, Bus, etc)    ║        ║
║ ║ ParallelPorts   — Number of Parallel Ports         ║        ║
║ ║ Processor       — Processor Type (8086, etc)       ║        ║
║ ║ ProcessorMhz    — Processor Speed (Mhz)            ║        ║
║ ║ SerialPorts     — Number of Serial Ports           ║        ║
║ ╚════════════════════════════════════════════════════╝        ║
║ Criteria Defined: All Computers Selected    Actions Specified: No ║
║ Procedure Saved: Yes   User Message Defined: No  Memory Available: 157712 ║
╚══════════════════════════════════════════════════════════════╝
```

F1—Help          Enter—Select          Esc—Cancel

FIG. 2E

Software Update and Distribution System 1.00C    December 20, 1993 10:50:14am

```
╔══════════════════ Create General Procedure ══════════════════╗
║ ╔═══════════════════ MachineMfr ═════════════════════╗        ║
║ ║ [ ] Acer                                           ║        ║
║ ║ [ ] COMPAQ                                         ║        ║
║ ║ [ ] IBM                                            ║        ║
║ ║ [ ] testing                                        ║        ║
║ ║ [ ] Unknown                                        ║        ║
║ ║                                                    ║        ║
║ ╚════════════════════════════════════════════════════╝        ║
║ Criteria Defined: All Computers Selected    Actions Specified: No ║
║ Procedure Saved: Yes   User Message Defined: No  Memory Available: 157712 ║
╚══════════════════════════════════════════════════════════════╝
```

F1—Help    Space—Select/Deselect    Enter—Accept    Esc—Cancel

FIG. 2F

Software Update and Distribution System 1.00C   December 20, 1993 10:55:45am

```
┌──────────────────────────────────────────────────────────────┐
│                  Create General Procedure                    │
│  ┌═══════════════════ Software Criteria ═══════════════════┐ │
│  │ No software items specified. Press INSERT to add an item.│ │
│  │                                                          │ │
│  │                                                          │ │
│  │                                                          │ │
│  │                                                        3 │ │
│  └──────────────────────────────────────────────────────────┘ │
│  Criteria Defined: All Computers Selected    Actions Specified: No │
│  Procedure Saved: Yes   User Message Defined: No   Memory Available: 157616 │
└──────────────────────────────────────────────────────────────┘
```

F1-Help Ins-Insert Del-Delete Enter-Modify Space-Toggle True/False

FIG. 2G

Software Update and Distribution System 1.00C   December 20, 1993 10:56:37am

```
┌──────────────────────────────────────────────────────────────┐
│                  Create General Procedure                    │
│  ┌═══════════════════ Select Field ═══════════════════════┐  │
│  │ Buffers           — DOS file BUFFERS allocated          │  │
│  │ CommandVersion    — COMMAND.COM VER Text String         │  │
│  │ DosTrueVersion    — Actual DOS Version                  │  │
│  │ DosVersion        — Reported DOS Version                │  │
│  │ Emm               — Expanded Memory Manager? (Y/N)      │  │
│  │ EmmDriverName     — Expanded Memory Driver Name (QEMM, etc)│ │
│  │ EmmVersion        — Expanded Memory Specification Version │ │
│  │ EnvironmentFree   — DOS Environment Block Free Size (Bytes)│ │
│  │ EnvironmentSize   — DOS Environment Block Size (Bytes)  │  │
│  │ LdDriverText      — LAN Driver Description              │  │
│  │ LdVersion         — LAN Driver Version                  │  │
│  │ MouseVersion      — Mouse Driver Version                │  │
│  │ NwIpxRevision     — NetWare IPX Revision                │  │
│  │ NwIpxVersion      — NetWare IPX Version                 │  │
│  │ NwSpxRevision     — NetWare SPX Revision                │  │
│  └──────────────────────────────────────────────────────────┘  │
│  Criteria Defined: All Computers Selected    Actions Specified: No │
│  Procedure Saved: Yes   User Message Defined: No   Memory Available: 157616 │
└──────────────────────────────────────────────────────────────┘
```

F1-Help          Enter-Select          Esc-Cancel

FIG. 2H

Software Update and Distribution System 1.00C    December 20, 1993 10:59:01am

```
╔══════════════════════ Create General Procedure ══════════════════════╗
║                      ═══ Select Field ═══                             ║
║   EnvironmentSize      — DOS Environment Block Size (Bytes)           ║
║   LdDriverText         — LAN Driver Description                       ║
║   Ld Version           — LAN Driver Version                           ║
║   MouseVersion         — Mouse Driver Version                         ║
║   NwIpxRevision        — NetWare IPX Revision                         ║
║   NwIpxVersion         — NetWare IPX Version                          ║
║   NwSpxRevision        — NetWare SPX Revision                         ║
║   NxSpxVersion         — NetWare SPX Version                          ║
║   NwsRevision          — NetWare Shell Revision                       ║
║   NwsVersion           — NetWare Shell Version                        ║
║   ShareLoaded          — SHARE Loaded? (Y/N)                          ║
║   Xmm                  — Extended Memory Manager? (Y/N)               ║
║   XmmDriverName        — Extended Memory Driver Name (HIMEM, etc)     ║
║   XmmDriverRev         — Extended Memory Driver Version               ║
║   XmmVersion           — Extended Memory Specification Version        ║
║                                                                       ║
║  Criteria Defined: All Computers Selected    Actions Specified: No    ║
║  Procedure Saved: Yes   User Message Defined: No  Memory Available: 157616 ║
╚═══════════════════════════════════════════════════════════════════════╝
```

F1—Help            Enter—Select            Esc—Cancel

FIG. 2I

Software Update and Distribution System 1.00C    December 20, 1993 10:59:11am

```
╔══════════════════════ Create General Procedure ══════════════════════╗
║                      ═══ XmmDriverName ═══                            ║
║   [ ] 386MAX                                                          ║
║   [ ] HIMEM.SYS                                                       ║
║   [ ] QEMM—386                                                        ║
║   [ ] Unknown                                                         ║
║                                                                       ║
║                                                                       ║
║                                                                       ║
║                                                                       ║
║                                                                       ║
║                                                                       ║
║  Criteria Defined: All Computers Selected    Actions Specified: No    ║
║  Procedure Saved: Yes   User Message Defined: No  Memory Available: 157616 ║
╚═══════════════════════════════════════════════════════════════════════╝
```

F1—Help    Space—Select/Deselect    Enter—Accept    Esc—Cancel

FIG. 2J

Software Update and Distribution System 1.00C    December 20, 1993 11:05:09am

```
┌─────────────────────────────────────────────────────────┐
│               Create General Procedure                  │
│    ┌═══════════General Procedure═══════════════┐        │
│  Crit │        ══Actions══                                │
│  Acti │ →Specify files to replace, create or delete      │
│  Proc │ →Text file edit commands                         │
│  Save │  INI file management                             │
│       │  DOS batch commands                              │
│       │  User notification message                       │
│       └──────────────────────────────────────────┘       │
│                                                          │
│                        ══ Status ══                      │
│ Procedure Active: Yes    Start Date 12/20/93   Start Time: 11:02 │
│ Criteria Defined: All Computers Selected    Actions Specified: No │
│ Procedure Saved: Yes   User Message Defined: No   Memory Available: 158752 │
└─────────────────────────────────────────────────────────┘
   F1—Help         Esc—Previous Menu         Enter—Select
```

FIG. 2K

Software Update and Distribution System 1.00C    December 20, 1993 11:05:17am

```
┌─────────────────────────────────────────────────────────┐
│               Create General Procedure                  │
│  ══════════════════ Files ═══════════════════           │
│   No files specified. Press INSERT to add a file.       │
│                                                          │
│            ═══ Select Option ═══                         │
│            │  file Replace      │                        │
│            │  file Create       │                        │
│            │  file Delete       │                        │
│            └────────────────────┘                        │
│                                                          │
│ Criteria Defined: All Computers Selected    Actions Specified: No │
│ Procedure Saved: Yes   User Message Defined: No   Memory Available: 158752 │
└─────────────────────────────────────────────────────────┘
      F1—Help       Enter—Accept         Esc—Cancel
```

FIG. 2L

Software Update and Distribution System 1.00C   December 20, 1999 11:07:08am

```
┌─────────────────────────────────────────────────────────────┐
│              Create General Procedure                       │
│ ╔═══════════════════ File Replace ═══════════════════════╗  │
│ ║ ┌File Name┐  ┌──────────── Search Path ──────────────┐ ║  │
│ ║ └─────────┘  └────────────────────────────────────────┘ ║  │
│ ║ [ ] Search Subdirectories   ( ) Search Boot Drive      ║  │
│ ║                             ( ) Search Local Drives    ║  │
│ ║ [ ] Create Backup           ( ) Search Only Drives In Search Path ║  │
│ ║                                                        ║  │
│ ║ ( ) Replace First Copy Found                           ║  │
│ ║ ( ) Replace All Copies Found                           ║  │
│ ║ ┌──────────────── Source Directory ──────────────────┐ ║  │
│ ║ │ FCS\SYS:FRYE/MAIN/SOURCE                           │ ║  │
│ ║ └────────────────────────────────────────────────────┘ ║  │
│ ╚════════════════════════════════════════════════════════╝  │
│                                                             │
│ Criteria Defined: All Computers Selected    Actions Specified: No │
│ Procedure Saved: Yes   User Message Defined: No  Memory Available: 158752 │
└─────────────────────────────────────────────────────────────┘
```

F1-Help Tab/Shift Tab-Next/Previous Space-New Value Enter-Accept Escape-Cancel

FIG. 2M

Software Update and Distribution System 1.00C   December 20, 1993 11:11:22am

```
┌─────────────────────────────────────────────────────────────┐
│              Create General Procedure                       │
│ ╔═══════════════════ File Create ════════════════════════╗  │
│ ║ ┌File Name┐                                            ║  │
│ ║ └─────────┘   [ ] Create Backup If File Already Exists ║  │
│ ║ ( ) Copy To Boot Drive                                 ║  │
│ ║ ( ) Copy To All Local Drives                           ║  │
│ ║ ( ) Copy To Drives Specified In The Destination Path   ║  │
│ ║ ┌──────────────── Destination Path ──────────────────┐ ║  │
│ ║ └────────────────────────────────────────────────────┘ ║  │
│ ║ ┌──────────────── Source Directory ──────────────────┐ ║  │
│ ║ │ FCS\SYS:FRYE/MAIN/SOURCE                           │ ║  │
│ ║ └────────────────────────────────────────────────────┘ ║  │
│ ║ ┌Decompression Application┐                            ║  │
│ ║ └─────────────────────────┘                            ║  │
│ ╚════════════════════════════════════════════════════════╝  │
│ Criteria Defined: All Computers Selected    Actions Specified: No │
│ Procedure Saved: Yes   User Message Defined: No  Memory Available: 158752 │
└─────────────────────────────────────────────────────────────┘
```

F1-Help Tab/Shift Tab-Next/Previous Space-New Value Enter-Accept Escape-Cancel

FIG. 2N

Software Update and Distribution System 1.00C    December 20, 1993 11:12:56am

```
┌─────────────────────────────────────────────────────────┐
│               Create General Procedure                  │
│ ┌═══════════════Text File Edit Commands═══════════════┐ │
│ │No edit commands specified. Press INSERT to add an edit command. │
│ │   ┌═════════Select Edit Command═════════┐           │ │
│ │   │──▶search and Replace                │           │ │
│ │   │   search and Insert                 │           │ │
│ │   │   add text to Top                   │           │ │
│ │   │   add text to Bottom                │           │ │
│ │   │   search and replace Line           │           │ │
│ │   └─────────────────────────────────────┘           │ │
│ │                                                     │ │
│ └─────────────────────────────────────────────────────┘ │
│                                                       2 │
│ Criteria Defined: All Computers Selected   Actions Specified: No │
│ Procedure Saved: Yes   User Message Defined: No  Memory Available: 158752 │
└─────────────────────────────────────────────────────────┘
```

F1—Help            Enter—Accept            Esc—cancel

FIG. 20

Software Update and Distribution System 1.00C    December 20, 1993 11:13:05am

```
┌─────────────────────────────────────────────────────────┐
│               Create General Procedure                  │
│ ┌════════════════Search And Replace════════════════════┐│
│ │ ┌File Name┐ ┌────────Search Path─────────┐           ││
│ │ │         │ │                            │           ││
│ │ └─────────┘ └────────────────────────────┘           ││
│ │ [ ] Search Subdirectories  ( ) Search Boot Drive     ││
│ │                            ( ) Search Local Drives   ││
│ │ [ ] Create Backup          ( ) Search Only Drives In Search Path │
│ │                                                      ││
│ │ [ ] Case Sensitive         [ ] Use Regular Expressions │
│ │ ┌─────────────Text To Search For──────────────┐      ││
│ │ │                                             │      ││
│ │ └─────────────────────────────────────────────┘      ││
│ │ ┌──────────────New Text ──────────────────────┐      ││
│ │ │                                             │      ││
│ │ └─────────────────────────────────────────────┘      ││
│ └──────────────────────────────────────────────────────┘│
└─────────────────────────────────────────────────────────┘
```

F1—Help Tab/Shift Tab—Next/Previous Space—New Value Enter—Accept Escape—Cancel

FIG. 2P

SOFTWARE UPDATING AND DISTRIBUTION

This application is a continuation of application Ser. No. 08/176,429, filed Dec. 30, 1993, now abandoned entitled SOFTWARE UPDATING AND DISTRIBUTION.

BACKGROUND OF THE INVENTION

1. Field of the Invention

The present invention relates generally to the control of software and files on computer networks. More particularly, the present invention relates to a system for automatically distributing software to and updating software and files on workstations on a computer network.

1.1. Reference to Microfiche Appendix

A microfiche appendix including Appendices A and B, with 254 frames on 3 fiche, was submitted with this application and is incorporated herein by reference.

2. Discussion of the Related Art

Currently, one of the primary barriers to software (i.e. computer programs) sales is the cost of installation and maintenance. Services (support, distribution/installation, updating, and administration) make up the largest expenditure of total personal computer (PC) software costs while the cost of the software itself accounts for only a small portion of these total costs. According to the Gartner Group's study of personal computer software costs for a 2,000 node local area network (LAN) over a five year life cycle, 91% of the costs are for services such as administration, distribution/installation, and support. Only 9% of the cost is allocated to the cost of the software itself (e.g. initial licenses, upgrades, acquisition costs, and programming).

As a result, many organizations update their software infrequently due to the costs involved. Additionally, one must consider the impact on users, since their computers are unavailable during this process and productivity is reduced. Some organizations have not networked their personal computers due to these problems. Yet, the expenses of supporting standalone personal computers are very high, since a standalone computer requires that a support person actually visit the user to determine the nature of a problem or to update the software on the PC.

As a result, a bottleneck currently exists for organizations that do not have their PC's connected to a computer network, since each PC must have its software updated individually. The same bottleneck exists in organizations that do have networked PC's due to the already discussed high cost of maintenance and support of software on the network.

Therefore, an object of the present invention is to provide a system for automatically distributing software from a file server to workstations located on a computer network.

Another object of the present invention is to provide a system for automatically updating, from a central location on a computer network, software installed in workstations connected to the computer network.

SUMMARY OF THE INVENTION

The present invention overcomes the disadvantages of the prior art by providing a new analytical paradigm and system for implementing the paradigm for updating and distributing software on a computer network. Within this disclosure, the term "computer network" is meant generally to include any type of computer network, such as a local area network or a wide area network. In addition, the term "computer network" is meant to encompass any type of network topology, such as star or ring type networks. Also, the term "computer network" is meant to generally include any type of data transmission protocol, such as ethernet, token ring, etc. Within this disclosure, the term "update" is meant to refer broadly to any type of operation that may be performed on software in a workstation or in a file server directly. Update thus includes operations such as replacing, deleting, installing, managing, revising, and creating software files. Also within this disclosure the terms workstation and personal computer (PC) are meant broadly to refer to any type of computer that may be connected to a computer network.

The present invention represents an entirely new class of network management software. It combines the classic concepts of software distribution with new approaches to file management. Automatic software distribution and installation, as well as automatic file updating and/or replacement are performed without requiring end-user intervention.

The present invention reduces complicated support and maintenance issues to a simple model. This model is called a procedure. A procedure includes two elements. The first element is called "criteria". Criteria are specified by the user and are used to create a filter that determines which workstations, workstation directories, workstation files, users, and/or file server directories are to be updated. The user may specify various types of hardware configurations, software configurations, file sizes, and so on as criteria. The configuration of each workstation or file server on the computer network is compared to the list of criteria. If a particular workstation, workstation directory, workstation file, user, and/or file server contains all of the specified criteria, then that workstation will be updated.

The second element of a procedure is called an "action". Actions are used to specify what steps are to be taken automatically at the selected workstations or file server directories. Some examples of actions might be to update certain files, delete certain files, edit specified files, or execute DOS batch commands.

The present inventor has realized that all software updating and distribution operations can be reduced to this two element paradigm. The user simply needs to specify, through criteria, the relevant characteristics of a workstation or file server directory that qualify the workstation or file server directory for updating. As soon as a workstation or file server directory meets the specified criteria, the specified action is automatically carried out. Any type of process that can be done from the workstation keyboard can be automated using an action.

One embodiment of the invention provides a system for updating software on at least one computer connected to a computer network, including means for defining at least one procedure, the at least one procedure including a set of criteria specifying a predetermined condition of the at least one computer and means, responsive to the means for defining, for executing a predetermined action, such as a program, when the set of criteria are true.

The features and advantages of the present invention will be more readily understood and apparent from the following detailed description of the invention, which should be read in conjunction with the accompanying drawings and from the claims which are appended at the end of the detailed description.

BRIEF DESCRIPTION OF THE DRAWINGS

In the drawings, which are incorporated herein by reference and in which like elements have been given like reference characters.

FIGS. 2A–2P are user interface menu screens that may be used by a user to specify criteria and actions that may be then operated upon by the program of the present invention;

Appendix A is a user manual for the program of the present invention, which is hereby incorporated by reference in its entirety; and Appendix B is a list of references that contain information concerning how to gather information about hardware and software configurations from a workstation on a computer network and how to remotely execute various commands at a workstation. All of the references listed in Appendix B are hereby incorporated by reference in their entirety. Both Appendices A and B are on microfiche.

DETAILED DESCRIPTION

For purposes of illustration only, and not to limit generality, the present invention will now be explained with reference to its use for updating software on PC workstations connected to a file server in a local area network. One skilled in the art will recognize that the present invention is not so limited and may be applied to updating software on any type of network having any type of computer connected to it.

Figure 1:
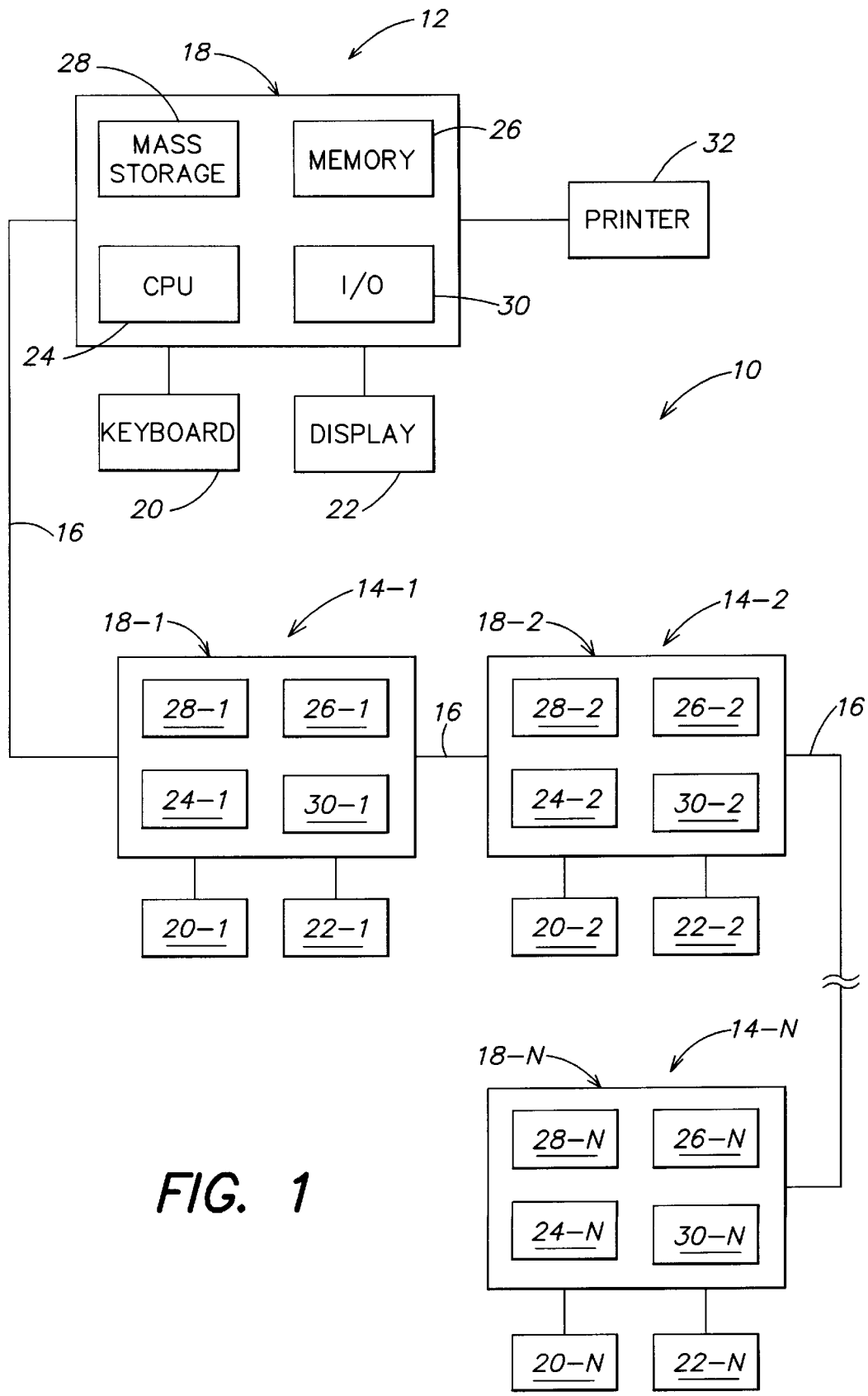
FIG. 1 illustrates a general purposes computer network that may be used, in conjunction with the program of the present invention, to update software.

FIG. 1 illustrates a generalized computer network that may be used as part of the present invention. A computer network 10 typically includes a file server 12 and workstations 14-1 through 14-N. Each workstation and file server 12 is coupled together by a transmission medium 16. The file server 12 typically includes a system unit 18 having a keyboard 20 and a display device 22 such as a CRT connected to the system unit. The system unit 18 typically contains a central processing unit (CPU) 24, a working memory 26, which is typically a RAM or ROM, and some type of mass data storage device 28. Mass storage device 28 may be, for example, a disk drive. System unit 18 also contains a network interface device 30 that provides any necessary hardware interface and software handshaking between the network transmission medium 16 and transmission protocol used thereon, and file server 12. A printer 32 may be attached to file server 12 to provide reports and permanent copies of data on file server 12. Work stations 14-1 through 14-N typically contain the same components as file server 12.

File server 12 and workstations 14, being PC's, typically use a version of the DOS operating system. Additionally, file server 12 may run shell software that provides an additional command layer between software being executed on workstations 14 and the DOS operating system running on file server 12. An example of a shell and network software that may be run on computer network 10 is Novell Netware, available from Novell, Incorporated.

Figure 2:
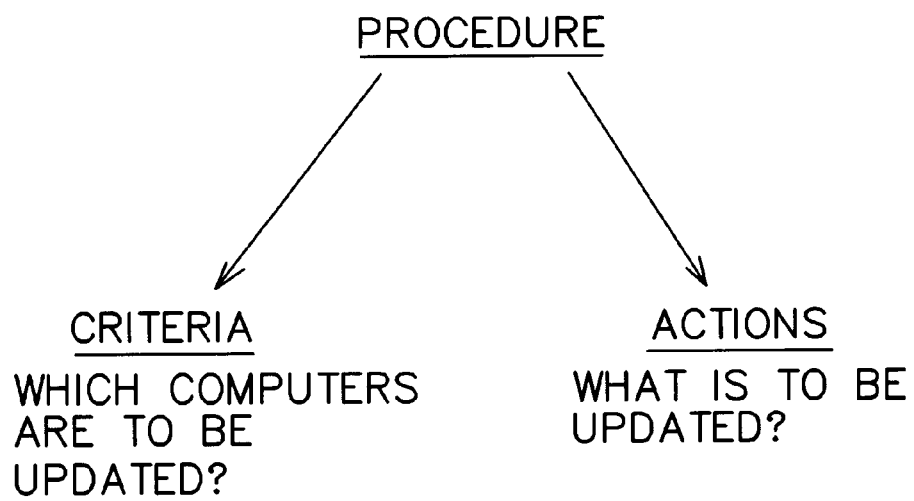
FIG. 2 is a diagrammatic representation of the procedure paradigm of the present invention.

FIG. 2 is useful for illustrating the general concept of a procedure. All of the operations relating to updating software on a computer network can be modeled using the procedure paradigm. As shown in FIG. 2, the procedure includes two parts, "criteria" and "actions". Criteria are used to specify which workstations or file server directories are to be updated. Actions are the events which take place at the selected workstations or file server directories when the criteria for a particular software update are satisfied.

Reference is now made to FIGS. 2A–2P which are user interface menus that are generated by the program of the present invention and are displayed on the display 22 and guide the user through the process of creating a procedure. The program of the present invention is typically installed on and run from file server 12. Generation of menus, entering data via windows on display, and executing commands and programs from menus are well understood by those skilled in the art and will not be discussed in detail.

In FIG. 2A, the user is presented with a general procedure menu. In the select option box, the user can choose to run the procedure for all computers which would result in software on all computers on the computer network being updated, or can specify criteria to select certain computers for updating. Choosing the option of Specify Criteria to Select Computers results in the menu of FIG. 2B being presented.

In FIG. 2B, the Node/User selection allows specific workstations to be selected to run a procedure. The Network Group selection allows selection of user groups for which the procedure will be run. The Hardware Criteria selection allows the user to specify physical characteristics of the workstation (or file server) and other equipment installed in the workstation (or file server). The Software Criteria selection allows the user to specify key characteristics of the software installed on the workstation (or file server). The Miscellaneous Criteria selection allows the user to specify other types of criteria. The File Criteria selection allows the user to specify files that must exist or not exist, that must match date or size specifications, or that contain a specific set of characters or words, for a procedure to be run. The Disk Space Requirements criteria allows the user to specify an amount of disk storage space that must be available on a target disk drive for a procedure to run.

If the user selects Hardware Criteria, for example, the menus illustrated in FIGS. 2C–2E are presented on display 22. The menu illustrated in FIG. 2E is a continuation of the menu illustrated in FIG. 2D. As illustrated in FIG. 2E, the user can select the Machine Manufacturer criterion, which causes file server 12 to display the machine manufacturer menu illustrated in FIG. 2F. By checking off the appropriate manufacturer, the user is able to specify, as one criterion, the type of computer for a particular procedure.

If the user selects Software Criteria, for example, the menus of FIGS. 2G–2I are presented on display 22 by file server 18. The menu illustrated in FIG. 2I is a continuation of the menu illustrated in FIG. 2H. If the user selects the XMMdrivername, file server 12 presents the menu of FIG. 2J in which the user can specify the extended memory driver name as a criterion. Pages 189–195 of the user manual of Appendix A specify examples of criteria that can be used by the program of the present invention.

Once the user has specified the criteria needed to determine which workstation or file server directory on the network will be updated, the user returns to the menu illustrated in FIG. 2A and chooses the Actions selection. Choosing Actions causes file server 12 to display the menu illustrated in FIG. 2K to the user. The Specify Files to Replace, Create, or Delete selection replaces workstation files with master copies from the network, creates new files by copying from master files, or deletes files from the workstation. The Text File Edit Commands selection allows modification of an existing file on the workstation by adding text to the beginning or end, searching for a specified string and adding new text after it, or searching for a specified string and replacing it with new text. The INI File Management selection allows the user to automatically perform most of the common modifications made on INI files including those INI files used by Microsoft Windows (such as Win.INI and System.INI). The DOS Batch Commands selection allows any DOS commands to be run on the workstation during the software updating process. The User Notification Message allows a message to be displayed to a user on display 22-1 of workstation 14-1, for example, informing the user that software on the workstation is about to be updated.

If the user selects the Specify Files to Replace, Create, or Delete option, file server 12 presents the menu illustrated in FIG. 2L on display 22. The File Replace selection in the menu illustrated in FIG. 2L causes file server 12 to display menu 2M on display 22. In the menu illustrated in FIG. 2M, the user enters certain information such as the file name and the search path to identify the file to be replaced. In the same manner, if the user had selected the File Create selection in the menu illustrated in FIG. 2M, the menu illustrated in FIG. 2N would be displayed and the user enters information such as the file name, destination path, and source directory for the file to be created.

Returning to FIG. 2K, if the user has selected the Text File Edit Commands option, file server 12 would display the menu illustrated in FIG. 2O. Selecting the Search and Replace option causes file server 12 to display the menu illustrated in FIG. 2P, in which the user specifies, for example, the file name, search path, the text to search for, and the new text to replace.

One skilled in the art will appreciate that the preceding menu selections and organization are meant to be exemplary only and other implementations of the criteria/actions paradigm of the present invention can be envisioned by those skilled in the art. Specifically, other types of criteria could be specified in other ways. Additionally, although DOS operations have been illustrated, clearly any operation that could be performed at the workstation keyboard can be an action that may be performed by the present invention.

Figure 3:
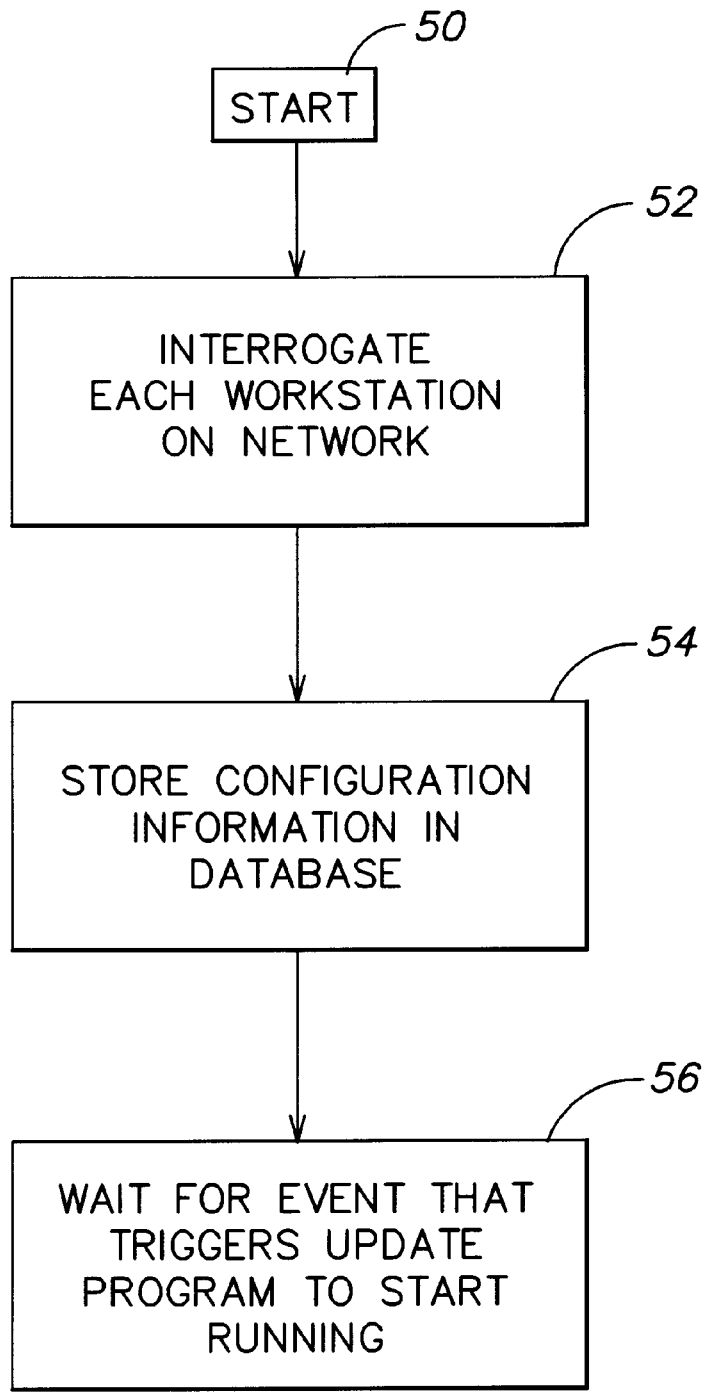
FIGS. 3 and 4 are flow charts illustrating the operation of the method of the present invention for automatically updating software.

Reference is now made to FIG. 3 which is a flow chart illustrating the steps that one aspect of the program of the present invention carries out. In step 50, the program is loaded onto file server 12 and begins executing. From step 50, the system proceeds to step 52. In step 52, the system interrogates each workstation on the network to determine its configuration, such as hardware and software configurations. This may be done using available interrogation programs and commands, such as described in the references listed in Appendix B. From step 52, the systems proceeds to step 54.

In step 54, the system stores the information gathered in step 52 about the configuration of each workstation and file server on the network in a database on file server 12. Any type of standard database format may be used to store configuration information. For example, the information may be stored as a simple list of codes for each workstation where each code represents a particular item of hardware or software specified in the criteria menus. From step 54, the system proceeds to step 56 in which the system waits for an event that causes the update program to be executed. The update program aspect of the present invention can be set to run continuously, to run at specified times, to run only when the network is rebooted, etc.

Figure 4:
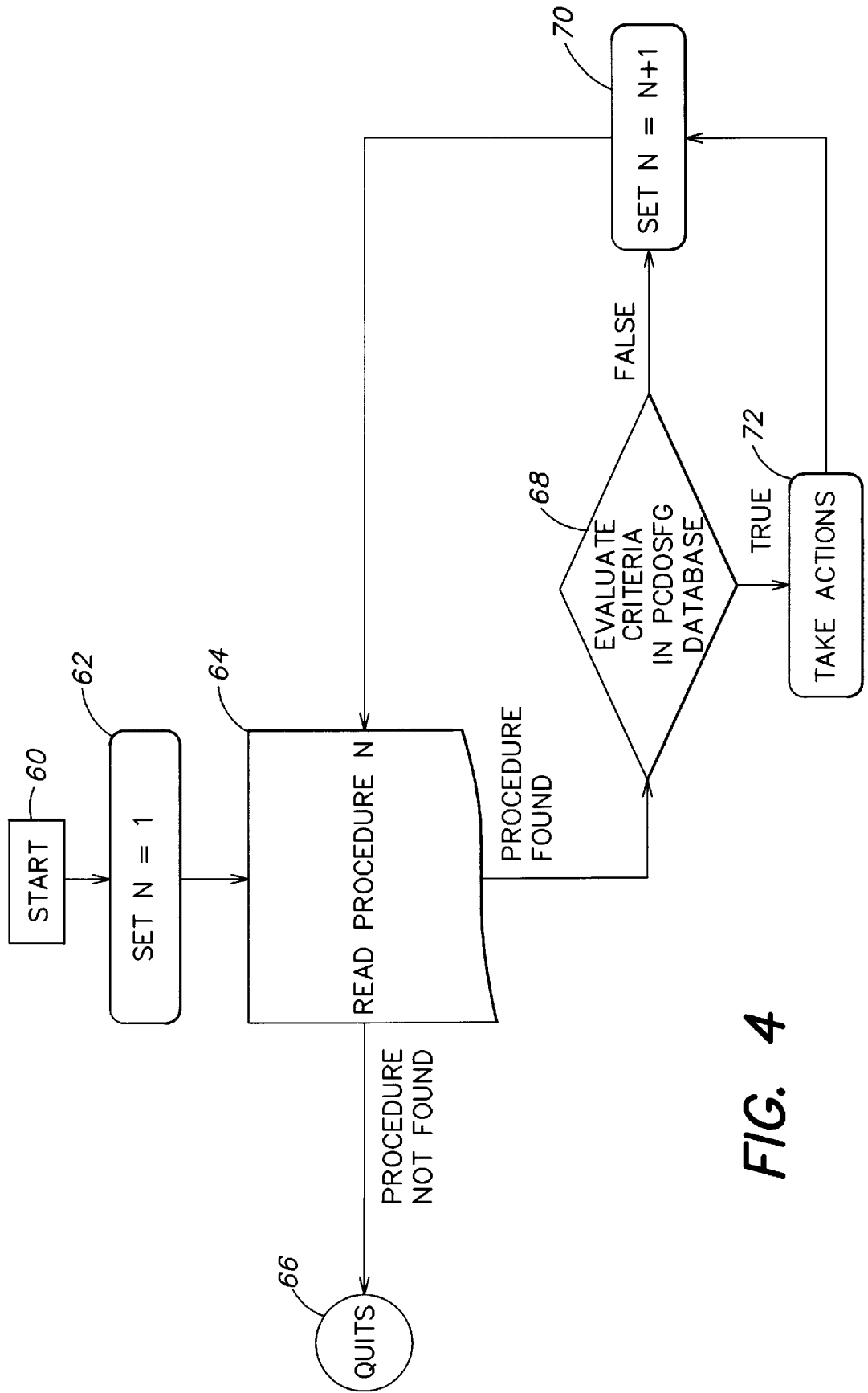

Reference is now made to FIG. 4, illustrating the steps the update program carries out according to the present invention. In step 60, the update program starts running as a result of a starting trigger. From step 60, the system proceeds to step 62, in which a variable N representing the first procedure to be run is set equal to one. From step 62, the system proceeds to step 64.

In step 64, the system determines if there is a procedure N. If a procedure N is found, the system then determines when that procedure is to run based upon previously specified criteria such as date, time, whether a user is logging in, and so on. Procedures can be set to execute at a certain time (for example, when the network is down to avoid disturbances) when a user logs on, when a workstation is booted, etc. If step 64 determines that the procedure exists and is to run, the system proceeds to step 68. On the other hand, if the system is not able to locate procedure N, the system proceeds to step 66 in which the program terminates.

In step 68, the system evaluates the criteria selected by the user through the menus illustrated in FIGS. 2B–2J, for example. The system may do this by comparing the configuration of each workstation stored in the database with the criteria specified by the user. If all of the criteria specified by the user for a particular procedure are satisfied, the system proceeds to step 72. On the other hand, if all the criteria are not satisfied, the system proceeds to step 70 in which the procedure number is incremented. From step 70, the system proceeds to step 64, and processing continues as previously described.

In step 72, the system updates the software on a workstation or in a file server directory by executing the actions specified by the user in, for example, the menus illustrated in FIGS. 2K–2P. From step 72, the system proceeds to step 70 and processing continues as previously described.

The present invention provides a number of advantages. It can automatically check workstation configurations on a computer network. If configurations of workstations change, this can be reported to the system administrator and/or automatically corrected in many cases. Additionally, when new workstations are added to the network, the system can automatically configure them to have a standard software configuration, thus avoiding the need to individually program each workstation as it is added to the network. For example, the present invention can be used to ensure that the CONFIG.SYS files of all workstations on the network are standardized.

The present invention advantageously allows computer network administrators to maintain the most up to date versions of their standard software applications, thus providing network users with the benefit of the newest features of programs. The invention also reduces the time during which a computer network is unavailable due to installing, updating, and fixing software that presently results in the inability of the network users to make use of the computer network. Furthermore, the present invention reduces the actual time that can be spent manually installing software across a network. Once a master copy of the software is loaded on file server 12, the present invention can automatically distribute and maintain the program on all the workstations connected to the computer network.

Having thus described one particular embodiment of the invention, various alterations, modifications, and improvements will readily occur to those skilled in the art. Such alterations, modifications, and improvements are intended to be part of this disclosure, and are intended to be within the spirit and scope of the invention. Accordingly, the foregoing description is by way of example only, and is not intended as limiting. The invention is limited only as defined in the following claims and the equivalents thereto.

What is claimed is:

1. An information processing system, comprising:

a computer network;

at least one file server connected to the computer network; and at least one computer connected to the computer network; wherein the at least one file server further includes
- a memory holding a software program and
- a processor executing instructions specified by the software program to:
  - a. issue commands over the computer network to interrogate the at least one computer to determine a system configuration thereof,
  - b. receive from a network manager a specified procedure, a set of criteria selected from a set of possible hardware and software configurations and a specified relationship between the set of criteria and the system configuration,
  - c. compare the set of criteria with the system configuration to find an actual relationship there between, and
  - d. update software on the at least one computer in accordance with the specified procedure, when the specified relationship is the same as the actual relationship found in the comparison.

2. An information processing system, comprising:

a computer network;

at least one file server connected to the computer network; and at least one computer connected to the computer network; wherein the at least one file server further includes
- a memory holding a software program and
- a processor executing instructions specified by the software program to:
  - a. issue commands over the computer network to interrogate the at least one computer to determine a system configuration thereof,
  - b. display at least one category of criteria for selection by a network manager,
  - c. receive from the network manager an update procedure, a selection of one or more of the displayed criteria and a definition of a relationship to be satisfied by a comparison of the system configuration with the selection of one or more of the displayed criteria,
  - d. compare the selection of one or more of the displayed criteria with the system configuration, and
  - e. when the relationship is satisfied by the comparison, perform the update procedure.

3. An information processing system, comprising:

a computer network;

at least one file server connected to the computer network; and at least one computer connected to the computer network; wherein the at least one file server further includes
- a memory holding a software program and
- a processor executing instructions specified by the software program to:
  - a. issue commands over the computer network to interrogate the at least one computer to determine a system configuration thereof,
  - b. display a set of criteria entered by a network manager,
  - c. display a relationship to be satisfied by a comparison of the set of criteria with the system configuration, the relationship entered by the network manager,
  - d. display an update procedure entered by the network manager,
  - e. compare the set of criteria with the system configuration to find an actual relationship therebetween, and
  - f. update software on the at least one computer in accordance with the specified procedure, when the specified relationship is the same as the actual relationship found in the comparison.

4. The system of claim 3, wherein the processor further executes instructions to modify at least one of the set of criteria, the relationship and the update procedure in accordance with input received from the network manager.

5. The system of claim 3, wherein at least one of the set of criteria, the relationship and the update procedure is entered by selection from a displayed list.

6. The system of claim 3, wherein at least one of the set of criteria, the relationship and the update procedure is entered as an arbitrary text input.

* * * * *